(12) United States Patent
Wang et al.

(10) Patent No.: US 12,715,535 B2
(45) Date of Patent: Aug. 25, 2026

(54) ALL-TERRAIN VEHICLE

(71) Applicant: Zhejiang CFMOTO Power Co., Ltd., Hangzhou (CN)

(72) Inventors: Jianyong Wang, Hangzhou (CN); Longping Luo, Hangzhou (CN); Junfeng Zhang, Hangzhou (CN); Mei Zhong, Hangzhou (CN); Liangchen Zhou, Hangzhou (CN)

(73) Assignee: Zhejiang CFMOTO Power Co., Ltd., Hangzhou (CN)

( * ) Notice: Subject to any disclaimer, the term of this patent is extended or adjusted under 35 U.S.C. 154(b) by 0 days.

(21) Appl. No.: 18/963,776

(22) Filed: Nov. 29, 2024

(65) Prior Publication Data

US 2025/0128762 A1 Apr. 24, 2025

Related U.S. Application Data

(63) Continuation of application No. PCT/CN2023/097036, filed on May 30, 2023.

(30) Foreign Application Priority Data

May 30, 2022 (CN) ......................... 202210605865.5

(51) Int. Cl.
*B62K 5/01* (2013.01)
*B60G 3/20* (2006.01)
(Continued)

(52) U.S. Cl.
CPC .................. *B62K 5/01* (2013.01); *B60G 3/20* (2013.01); *B60K 17/34* (2013.01); *B60R 25/04* (2013.01);
(Continued)

(58) Field of Classification Search
CPC ........ B62D 17/00; B60G 7/001; B60G 7/005; B60G 2206/82; B60G 2206/50; B60G 2204/148
See application file for complete search history.

(56) References Cited

U.S. PATENT DOCUMENTS 6,588,776 B1 * 7/2003 Irwin .................... B62D 17/00
280/86.756
10,723,190 B2 7/2020 Hu et al.
(Continued)

FOREIGN PATENT DOCUMENTS

CN 101428643 A 5/2009
CN 205292786 U 6/2016
(Continued)

OTHER PUBLICATIONS

Wang, CN-216507769-U, Machine Translation of Specification (Year: 2022).*

*Primary Examiner* — Paul N Dickson
*Assistant Examiner* — Matthew Joseph Ganci
(74) *Attorney, Agent, or Firm* — Shewchuk IP Services, LLC; Jeffrey D. Shewchuk

(57) ABSTRACT

An all-terrain vehicle includes a frame, wheels, a suspension system, a prime mover assembly, and a drive train. The front suspension includes left and right upper rocker A-arms pivotally connected to the frame, left and right lower rocker A-arms pivotally connected to the frame, and left and right front knuckle connected between the respective upper and lower rocker A-arms and the respective front wheel. Each front knuckle has upper and lower connecting portions for attaching to the upper and lower rocker A-arms, at least one of which is separately formed from the main body with a flange connected to the main body by at least one fastener. A camber adjusting spacer can be positioned between the
(Continued)

flange and the main body to adjust camber of the respective front wheel.

19 Claims, 9 Drawing Sheets

(51) Int. Cl.

| | |
|---|---|
| ***B60K 17/34*** | (2006.01) |
| ***B60R 25/04*** | (2013.01) |
| ***B60R 25/24*** | (2013.01) |
| ***B60R 25/33*** | (2013.01) |
| ***B60T 1/06*** | (2006.01) |
| ***B60T 7/04*** | (2006.01) |
| ***B60T 7/08*** | (2006.01) |
| ***B60T 13/12*** | (2006.01) |
| ***B62D 17/00*** | (2006.01) |
| ***B62K 19/06*** | (2006.01) |
| ***B62K 19/30*** | (2006.01) |

(52) U.S. Cl.
CPC ............ *B60R 25/245* (2013.01); *B60R 25/33* (2013.01); *B60T 1/065* (2013.01); *B60T 7/04* (2013.01); *B60T 7/08* (2013.01); *B60T 13/12* (2013.01); *B62D 17/00* (2013.01); *B62K 19/06* (2013.01); *B62K 19/30* (2013.01); *B60G 2200/144* (2013.01); *B60G 2300/07* (2013.01); *B60G 2300/124* (2013.01)

(56) References Cited

U.S. PATENT DOCUMENTS

| | | | | |
|---|---|---|---|---|
| 11,220,147 | B2 | 1/2022 | Hu et al. | |
| 2013/0175779 | A1 * | 7/2013 | Kvien | B62D 21/183 280/124.15 |
| 2018/0147902 | A1 | 5/2018 | Hu et al. | |
| 2021/0031713 | A1 | 2/2021 | Kotrla et al. | |
| 2022/0080796 | A1 * | 3/2022 | Dong | B60G 13/003 |

FOREIGN PATENT DOCUMENTS

| | | | | |
|---|---|---|---|---|
| CN | 216507769 | U * | 5/2022 | |
| CN | 217435925 | U | 9/2022 | |
| CN | 217515301 | U | 9/2022 | |
| EP | 3118032 | A1 * | 1/2017 | B60G 3/20 |
| JP | 2002274134 | A | 9/2002 | |

* cited by examiner 132
1321
13

11
14
135
1312
131
1311
134
1312
133
135

131
1332
1331
1332
133
133
1311
γ
1314
1333
135
1313
134
1311
135
1341
1341
1317
1312
1312
101
1316
1312

1332
1332
133
133
1311
1311
121
162
δ
11
1312
161
162
1312
121

ALL-TERRAIN VEHICLE

RELATED APPLICATION INFORMATION

The present application is a continuation of and claims the benefits of priority to International Application Number PCT/CN2023/097036, entitled ALL-TERRAIN VEHICLE, filed on May 30, 2023, and further claims priority to Chinese Patent Disclosure No. 2022106058655, entitled ALL-TERRAIN VEHICLE, filed on May 30, 2022. The entire contents of the above-referenced applications are incorporated herein by reference.

FIELD OF THE DISCLOSURE

The present disclosure relates to the field of vehicle technology, and particularly relates to an all-terrain vehicle.

BACKGROUND OF THE DISCLOSURE

All-terrain vehicles are four-wheeled off-road vehicles that are intended for use in all weather conditions and over a wide variety of terrains. The frame of the all-terrain vehicle is key as the main load-bearing component of the vehicle, supported from wheels via a suspension. The reliability and service life study of the vehicle, the maneuvering stability of the vehicle, driving safety, and riding comfort are all inseparable from the structure and performance of the frame and suspension. In order to adapt to a variety of complex operating environments, high demands are placed on the suspension and frame of all-terrain vehicles.

At present, although some all-terrain vehicles are equipped with better performance suspensions, all-terrain vehicles do not adapt well to being driven over difficult terrain and trail conditions, thereby unduly affecting their comfort, sports performance, and even their service life.

More effective solutions are needed for how to optimize the suspension structure to improve the comfort and sport performance of the all-terrain vehicle and increase the service life of the vehicle.

SUMMARY OF THE INVENTION

The present invention is an all-terrain vehicle which solves at least one of the problems in the background of the disclosure.

In a first aspect, an all-terrain vehicle includes a frame, wheels, a suspension system a prime mover assembly and a drive train. The wheels include a left front wheel, a right front wheel and rear wheel. The suspension system has a front suspension connecting the front wheels to the frame and a rear suspension connecting the rear wheels to the frame. The front suspension, on left and right sides, has an upper rocker A-arm pivotally connected to the frame, a lower rocker A-arm pivotally connected to the frame, and a front knuckle connected between the upper and lower rocker A-arms and the front wheel. The prime mover assembly is at least partially disposed on the frame and provides locomotive power to rotationally drive the wheels. The drive train is at least partially disposed on the frame and transmits torque from the prime mover assembly to the wheels. Each front knuckle has a main body defining a front axle bore, an upper connecting portion for connecting to the upper rocker A-arm, and a lower connecting portion for connecting to the lower rocker A-arm. At least one of the upper connecting portion and the lower connecting portion is separately formed from the main body with a flange connected to the main body by at least one fastener. A camber adjusting spacer can be positioned between the flange and the main body to adjust camber of the respective front wheel. The camber adjusting spacer can be changed without fully removing the at least one fastener from the front knuckle.

In another aspect, a rocker A-arm length ratio of the upper rocker A-arm length to the lower rocker A-arm length is in the range from 0.5 to 1.15. Additionally, the drive train includes a front differential and left and right front half shafts. The half shafts slope downwardly and outwardly, defining a half shaft front view projection angle in front view and relative to horizontal in the range from 0° to 60°.

The details of one or more embodiments are presented in the following drawings and descriptions to make the other features, objectives, and advantages of the present invention more concise and understandable.

BRIEF DESCRIPTION OF THE DRAWINGS

The drawings described here are intended to provide a further understanding of preferred embodiments of the present invention. The illustrative embodiments and explanations of the detailed description are used to explain the present invention and do not constitute an improper limitation of the invention. In the drawings.

DETAILED DESCRIPTION

For a better understanding of the purpose, technical solutions and advantages of the present invention, the present invention will be described and illustrated in conjunction with the accompanying drawings and embodiments below.

Figure 1:
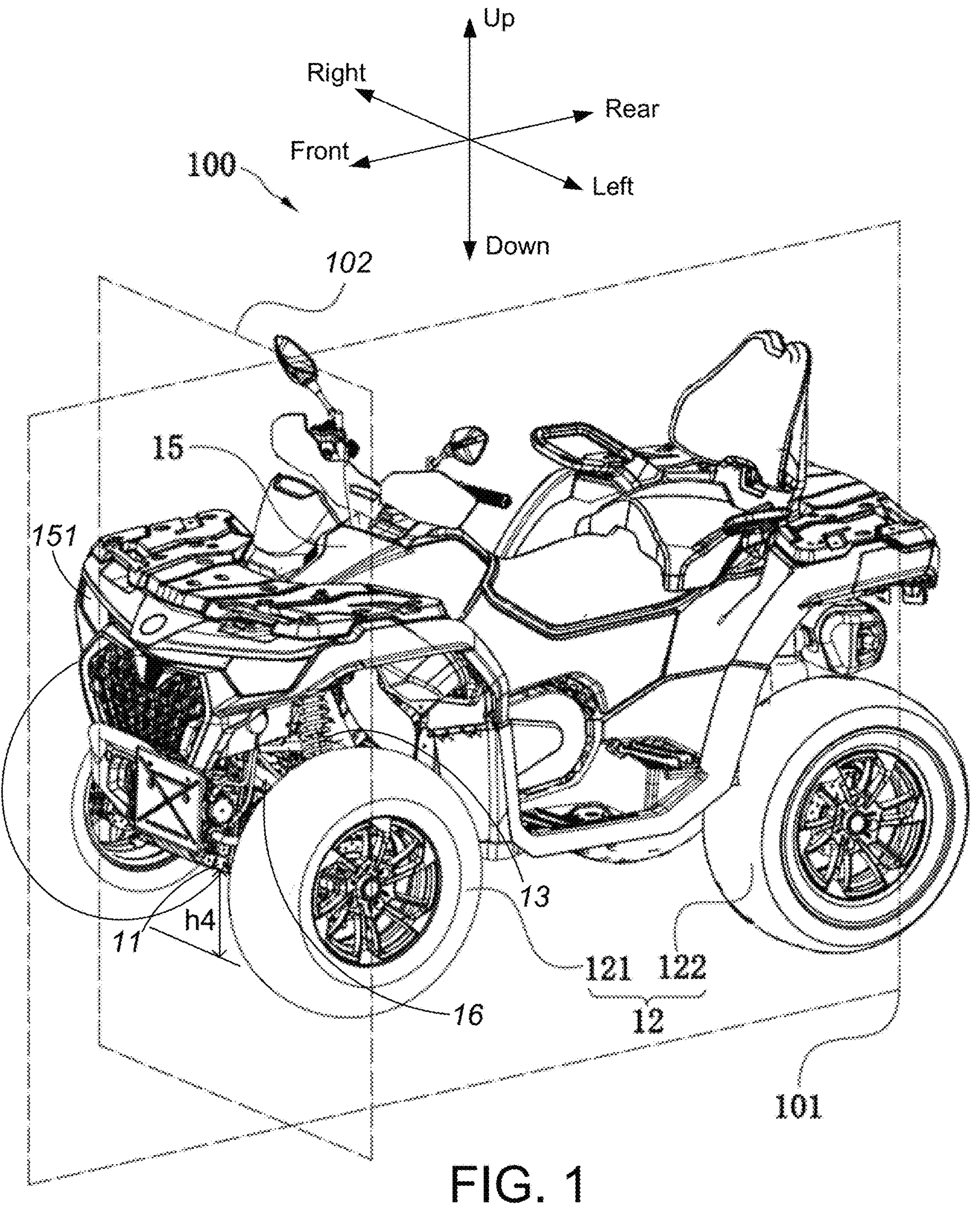
FIG. 1 is a front left perspective view of an all-terrain vehicle of the present invention.
Figure 2:
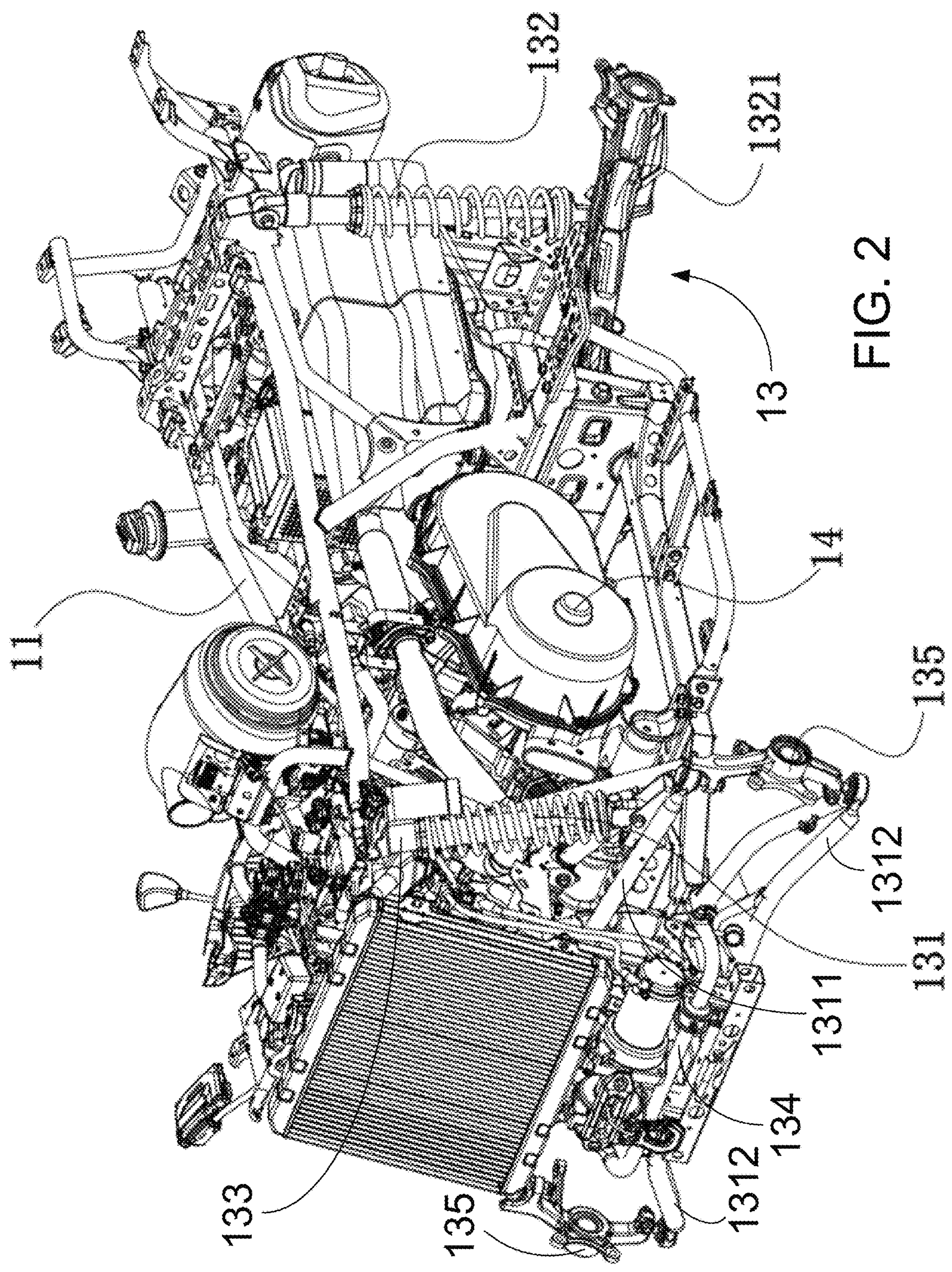
FIG. 2 is a front left perspective view of the all-terrain vehicle of FIG. 1, with the wheels and vehicle body cover removed to better show some of the internal structures.

As shown in FIGS. 1 and 2, an all-terrain vehicle 100 in accordance with the present invention includes a frame 11, wheels 12, a suspension 13, a prime mover assembly 14, a vehicle body cover 15, and a drive train 16. The wheels 12 include a pair of front wheels 121 and a pair of rear wheels 122. The suspension 13 includes a front suspension 131 which connects the front wheels 121 to the frame 11 and a rear suspension 132 which connects the rear wheels 122 to the frame 11. The prime mover assembly 14 is supported on the frame 11 for providing locomotive power to rotationally drive the wheels 12. The vehicle body cover 15 is at least partially disposed on the frame 11. The drive train 16 is at least partially disposed on the frame 11 and transmits torque from the prime mover assembly 14 to the wheels 12.

The general orientations of front, rear, left, right, up and down are defined as shown in FIG. 1 for clarity. The terms "up", "down" "vertical", "horizontal", etc. used herein assume the vehicle wheels are on a flat, horizontal surface, i.e., not on a slope, and with the wheel/tire sizes depicted. A longitudinal mid-plane 101 is defined as a vertical plane perpendicular to the left-right direction and running down the centerline of the vehicle 100. A front axis plane 102 is defined as a vertical plane perpendicular to the front-rear direction and containing the rotational axes of the unturned front wheels 121.

As shown in FIGS. 2-5, the front suspension 131 includes left and right front knuckles 135. The front knuckles 135 transfer and tolerate the front load of the all-terrain vehicle 100 and control the orientation of the front wheels 121 for steering of the all-terrain vehicle 100. Each front knuckle 135 includes a main body 1351 defining a front axle bore 1352, with the centerline of the front axle bore 1352 being coincident with the rotational axis of the front wheels 121. That is, when the front wheels 121 are unturned, the centerline of the front axle bore 1352 is within the front axis plane 102.

The front suspension 131 includes left and right upper rocker A-arms 1311 and left and right lower rocker A-arms 1312 as shown in FIGS. 2 and 4-6. The outer end of each upper rocker A-arm 1311 is pivotally connected to an upper connecting portion 1353 (called out in FIG. 7) of the respective knuckle 135, and the inner ends of each upper rocker A-arm 1311 are pivotally connected to the frame 11 at a front upper pivot joint 111 and a rear upper pivot joint 112 (shown in FIG. 3). Both upper pivot joints 111, 112 are at an elevation higher than the centerline of the front axle bore 1352. The outer end of each lower rocker A-arm 1312 is pivotally connected to a lower connecting portion 1354 (called out in FIG. 7) of the respective knuckle 135, and the inner ends of each lower rocker A-arm 1312 are pivotally connected to the frame 11 at a front lower pivot joint 113 and a rear lower pivot joint 114 (shown in FIG. 3). While the vehicle 100 is stationary with the front suspension 131 at its rest position, both lower pivot joints 113, 114 are at least partially at an elevation lower than the centerline of the front axle bore 1352. Suspension travel can allow the centerline of the front axle bore 1352 to dip to an elevation below both lower pivot joints 113, 114. Both front pivot joints 111, 113 are preferably at least partially in front of the front axis plane 102. Both rear pivot joints 112, 114 are preferably at least partially behind the front axis plane 102.

The front suspension 131 includes right and left front shock absorbers 133, preferably mounted between mid-outer portions of the respective upper rocker A-arm 1311 and the frame 11, connected to both the upper rocker A-arms 1311 and the frame 11 such as by sheet metal components. Suspension travel causes the front shock absorbers 133 to lengthen or shorten as the upper and lower A-arms 1311, 1312 pivot, while dampening the suspension movement. The front suspension 131 also includes a front torsion bar 134 pivotally mounted to the frame 11, which functions to reduce sway of the vehicle 100 when the vehicle 100 hits a bump that causes suspension travel substantially on only one (right or left) side of the vehicle 100. The front torsion bar 134 is preferably connected by links 1341 to middle locations of the right and left lower rocker A-arms 1312. In the transverse direction such as shown in FIG. 5, the links 1341 of the front torsion bar 134 are preferably positioned outside top pivot mounts 1332 of the front shock absorbers 133 but inside bottom pivot mounts 1333 of the front shock absorbers 133.

Figure 3:
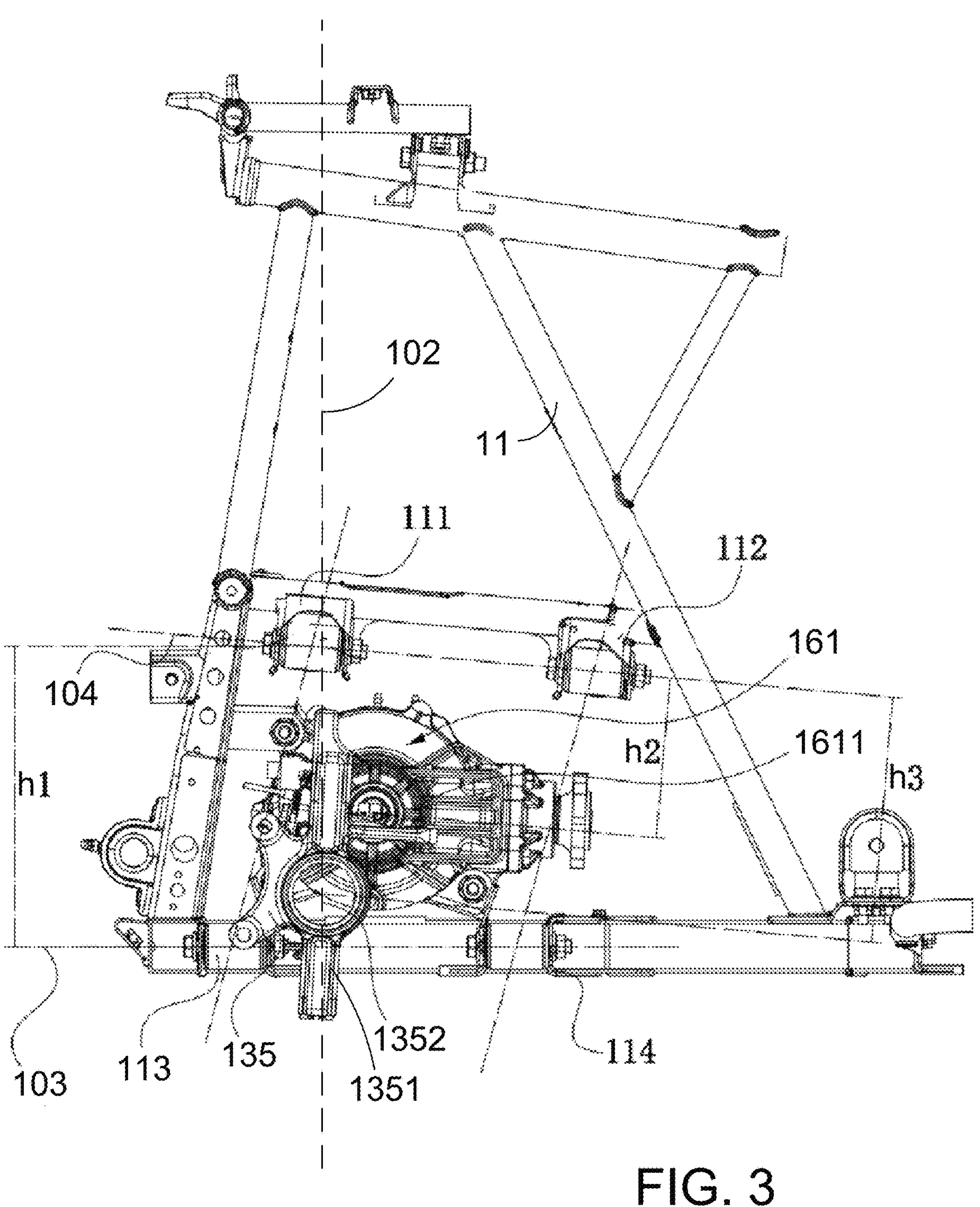
FIG. 3 is left side view of a front differential and a front portion of the frame with portions of the front suspension of the all-terrain vehicle of FIGS. 1 and 2.
Figures 5, 6:
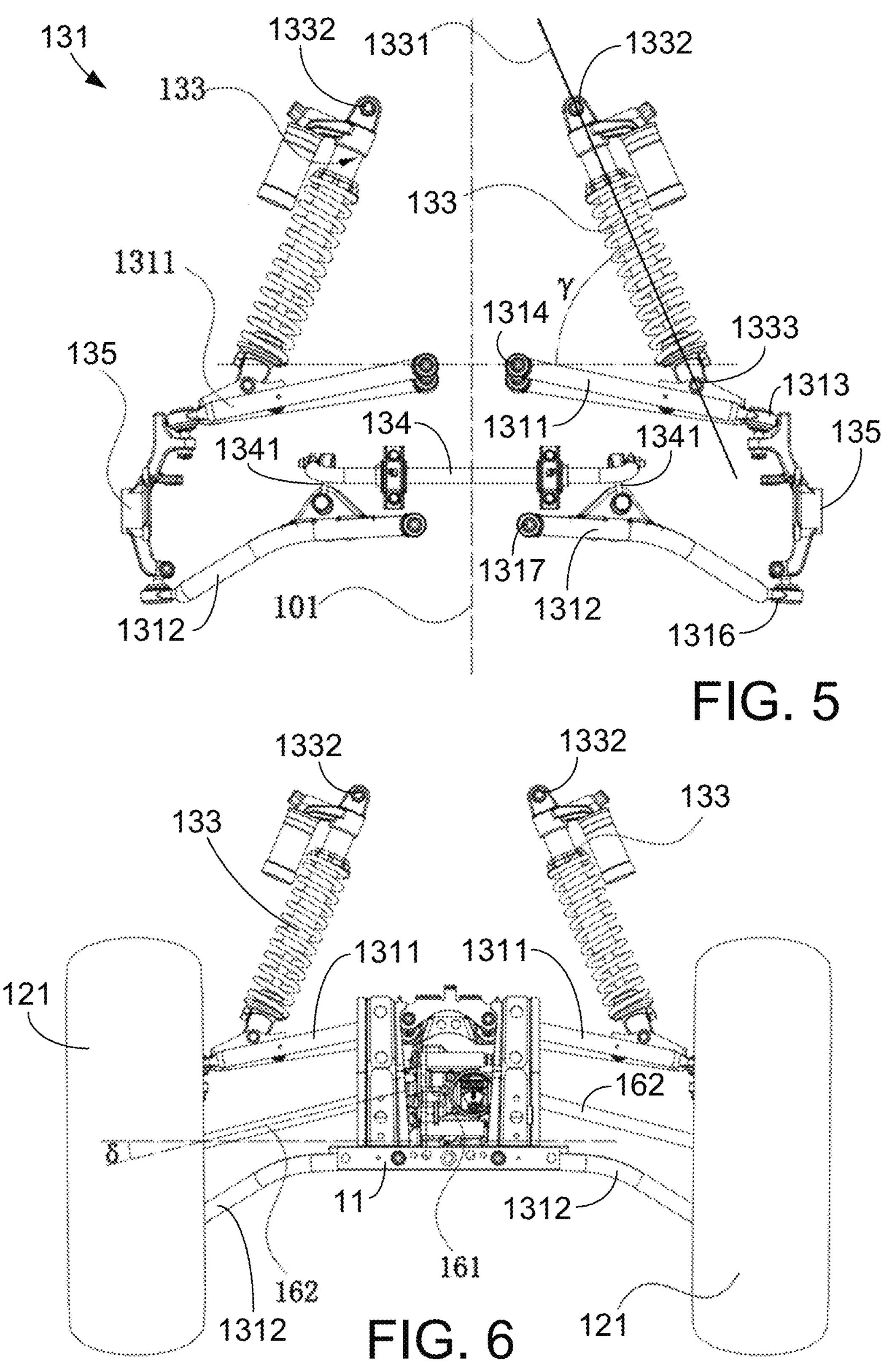
FIG. 5 is a front view of the front suspension of FIG. 4.
FIG. 6 is a front view of the front suspension of FIGS. 4 and 5, not showing the front torsion bar, and further showing the front wheels, front differential, front half shafts and a portion of the front frame of the all-terrain vehicle of FIGS. 1 and 2.

The drive train 16 includes a front differential 161 shown in FIGS. 3 and 6. The front differential 161 delivers torque to the right and left front wheels 121 via respective right and left front half shafts 162 shown only in FIG. 6.

The layout of the front suspension 131 can be further understood with reference to its positioning relative to the front differential 161 and the front half shafts 162. Specifically, the front and rear lower pivot joints 113, 114 define a respective lower pivot axis about which the respective lower rocker A-arm 1312 pivots, and the right and left lower pivot axes are both disposed in a lower pivot plane 103 as called out in FIGS. 3 and 4. The lower pivot plane 103 is preferably substantially horizontal. The front upper pivot joint 111 has its center position at an elevation above the lower pivot plane 103 which defines a front upper pivot vertical gap h1 called out in FIG. 3. The front and rear upper pivot joints 111, 112 define a respective upper pivot axis about which the respective upper rocker A-arm 1311 pivots, and the right and left upper pivot axes are both disposed in an upper pivot plane 104 as also called out in FIGS. 3 and 4. In the preferred embodiment shown, the upper pivot plane 104 is sloped downwardly and rearwardly, most preferably at about 5° relative to horizontal. The distance between the differential output centerline (i.e., the inner end points of the axes of the front half shafts 162) and the upper pivot plane 104 is defined as a differential output/upper pivot distance h2 called out in FIG. 3. A differential output ratio h2/h1 of the differential output/upper pivot distance h2 to the front upper pivot vertical gap h1 is preferably in the range from 0.1 to 0.8, and more preferably in the range from 0.2 to 0.7. The distance between the half shaft output centerline 1611 (i.e., the outer end points of the axes of the front half shafts 162) and the upper pivot plane 104 is defined as a half shaft output/upper pivot distance h3 called out in FIG. 3. A half shaft output ratio h3/h1 of the half shaft output/upper pivot distance h3 to the front upper pivot vertical gap h1 is preferably in the range from 0.5 to 1, and more preferably in the range from 0.6 to 0.9. These values for differential output ratio h2/h1 and half shaft output ratio h3/h1 improve the passability and anti-pitching performance of the all-terrain vehicle 100 and reduce stress concentrations on the suspension 13, thereby improving the stability and service life of the all-terrain vehicle 100.

Each front shock absorber 133 extends about a front shock absorber axis 1331 from the top pivot mount 1332 connected on the frame 11 to the bottom pivot mount 1333 connected on the upper rocker A-arm 1311. In addition to being at a higher elevation, the top pivot mount 1332 is preferably located inwardly relative to the bottom pivot mount 1333, and the top pivot mount 1332 is preferably also located rearwardly relative to the bottom pivot mount 1333.

Figure 4:
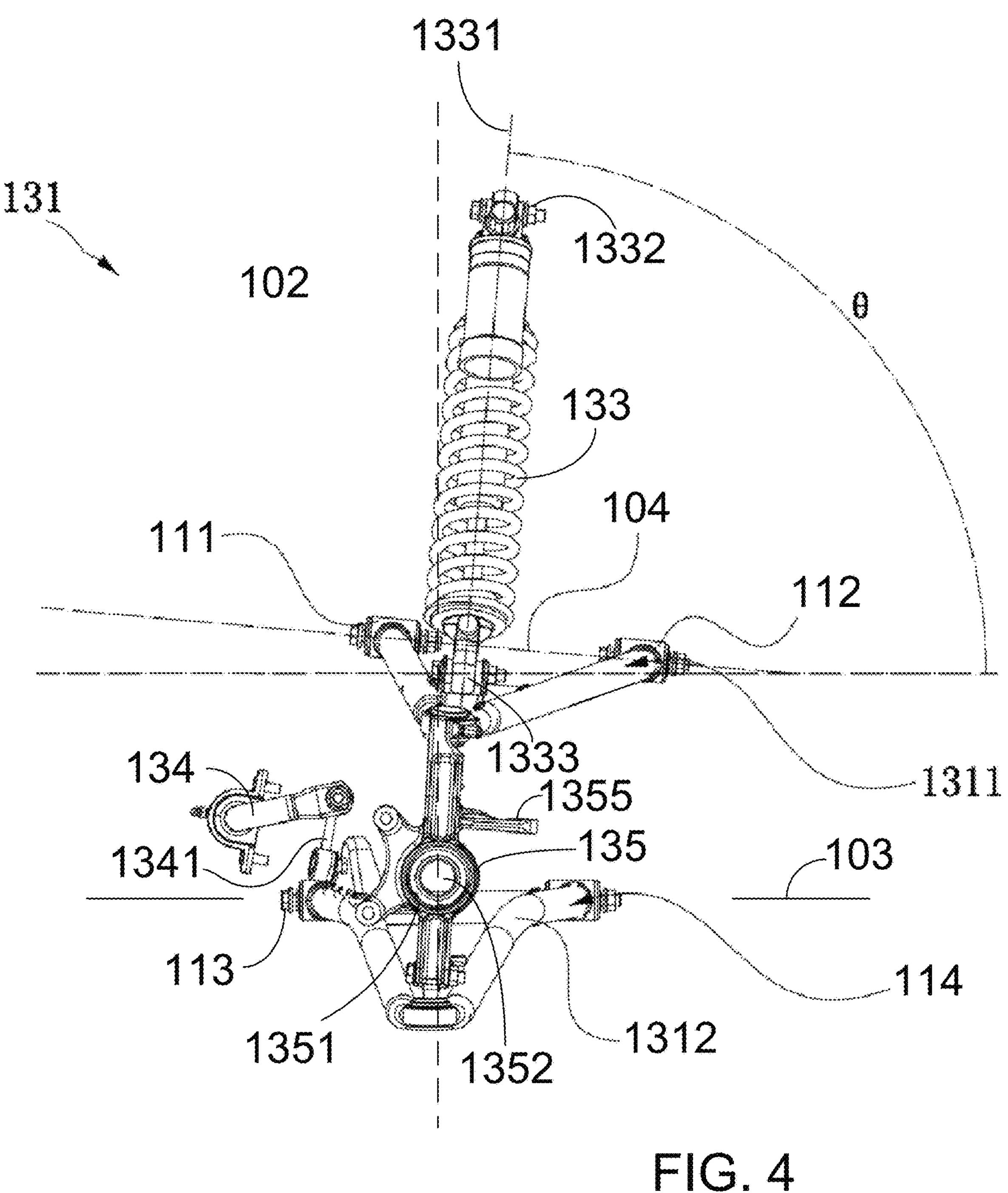
FIG. 4 is a left side view of the front suspension of the all-terrain vehicle of FIGS. 1 and 2.

The front shock absorber axis 1331 is thus angled relative to vertical. In the preferred embodiment, the top pivot mount 1332 and the bottom pivot mount 1333 of the front shock absorber 133 each define pivot axes of the shock absorber 133 which are substantially parallel to the upper pivot plane 104, which improves the operational stability and increases safety of the all-terrain vehicle 100. As shown in FIG. 4, this places the front shock absorber axis 1331 at a rearward shock absorber lean angle θ relative to horizontal. The rearward shock absorber lean angle θ is preferably in the range from 60° to 110°, more preferably in the range from 65° to 105°, even more preferably in the range from 70° to 100°, and most preferably in the range from 80° to <90°. For instance, FIG. 4 shows a rearward shock absorber lean angle θ of about 85°, which improves space utilization of the all-terrain vehicle 100. The front shock absorber axis 1331 extends at an inward shock absorber lean angle γ relative to horizontal as shown in FIG. 5. The inward shock absorber lean angle γ is preferably in the range from 40° to <90°, more preferably in the range from 45° to 85°, and most preferably in the range from 50° to 80°. For instance, FIG. 5 shows an inward shock absorber lean angle γ of about 67°. These values for inward shock absorber lean angle γ keep the compression strokes of the front shock absorbers 133 in a reasonable range.

The differential output centerline 1611 is preferably close to the front axis plane 102. In the preferred embodiment, the differential output centerline 1611 is slightly rearward of the front axis plane 102 as shown in FIG. 3. The differential output centerline 1611 is preferably at a higher elevation than the half shaft output centerline. In other words, the half shafts 162 primarily slope downwardly and outwardly, defining a half shaft front view projection angle δ in front view and relative to horizontal as shown in FIG. 6. The half shaft front view projection angle δ is in the range from 0° to 60°, preferably in the range from 0° to 45°, and more preferably in the range from 0° to 30°. For instance, the half shaft front view projection angle δ for the embodiment shown in FIG. 6 is about 14°, which improves the transmission efficiency of the drive train 16 while the front suspension 131 provides excellent vibration damping performance.

Figure 7:
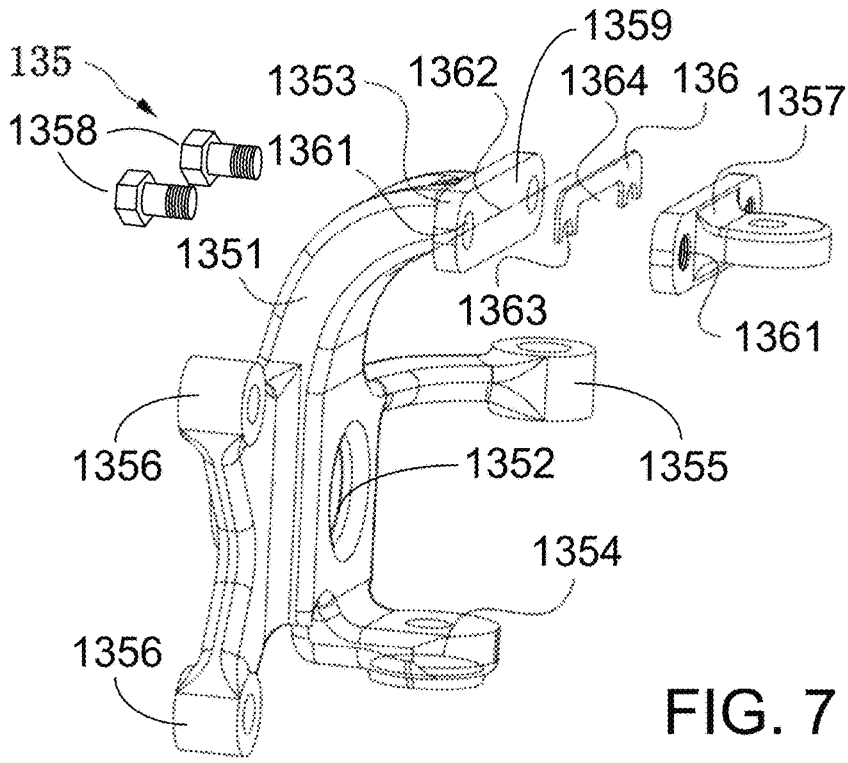
FIG. 7 is an exploded perspective view of the front right knuckle of the all-terrain vehicle of FIG. 1 using the front suspension of FIGS. 2, 4 and 5.

The preferred design of the front knuckle 135 is best shown in FIG. 7. The main body 1351 preferably includes a steering arm 1355 extending rearwardly for connecting to steering linkage (not shown), and two brake caliper connection arms 1356 extending forwardly for attachment of braking components (not shown) for the associated front wheel 121. The main body 1351 provides only one of the upper or lower connecting portions 1353, 1354, e.g., in the preferred embodiment the main body 1351 provides only the lower connecting portion 1354. The upper connecting portion 1353 of each front knuckle 135 is separate from the main body 1351, such as by having a upper connecting portion flange 1357 which is bolted with two bolts 1358 to a top arm flange 1359 of the main body 1351. A shim or camber adjusting spacer 136 can be positioned between the upper connecting portion flange 1357 and the top arm flange 1359. Different sizes/thicknesses (not shown) of the camber adjusting spacer 136 can be used to change the camber angle of the associated front wheel 121, so as to compensate for manufacturing errors, improve the handling characteristics of the all-terrain vehicle 100 and provide good grip under extreme working conditions to improve the safety of the all-terrain vehicle 100.

In the preferred embodiment, the bolt holes 1361 for the flanges 1357, 1359 define a flange centerline 1362, and the camber adjusting spacer 136 is installed entirely on only one side of (preferably above) the flange centerline 1362. As such, the camber adjusting spacer 136 does not circumscribe either of the bolts 1358 that hold the upper connecting portion 1353 to the main body 1351. If it is desired to change the camber of the associated wheel 121, maintenance personnel need only somewhat loosen the two bolts 1358, pull out the camber adjusting spacer 136 and replace it with a thicker or thinner camber adjusting spacer (not shown) to make the desired camber correction, and then retighten the two bolts 1358. Substitution of the camber adjusting spacer 136 is therefore quickly and easily achieved without full removal of the bolts 1358 and without full separation of the upper connecting portion 1353 from the main body 1351. In the preferred embodiment, the camber adjusting spacer 136 is preferably positioned on the top side of the flange centerline 1362, with a plurality of half-holes 1363 that can each gravitationally rest on the corresponding connecting bolt 1358 to achieve proper positioning. The outer profile contour of the camber adjusting spacer 136 is substantially the same as the outer profile contour of the top halves of the flanges 1357, 1359, so when assembled the camber adjusting spacer 136 is sandwiched between the flanges 1357, 1359 and does not extend beyond the flanges 1357, 1359.

In the preferred embodiment, the camber adjusting spacer 136 includes a slot or recess 1364, so that the adjusting spacer 136 is substantially C-shaped. The recess 1364 is used to reduce the weight of the camber adjusting spacer 136, which reduces the amount of material required for the camber adjusting spacer 136 and therefore the cost of the camber adjusting spacer 136. In the field, camber adjusting spacers are provided in kits with a number of different thicknesses to produce varying amounts of camber adjustment. For instance, one kit of camber adjusting spacers may include series of ten spacers ranging from 0.4 mm to 4 mm in thickness in 0.4 mm increments, which allow camber adjustments from 0° to about 2° degrees in about 0.2° degree increments. An alternative kit of camber adjusting spacers may include 0.4 mm, 0.8 mm, 1.6 mm and 3.2 mm thick spacers, intended to be used with either one spacer or multiple spacers in combination to allow the same increments of camber adjustment. In either case, kits of camber adjusting spacers can be provided at lost cost to enable quick and precise camber adjustment by maintenance personnel.

Figure 8:
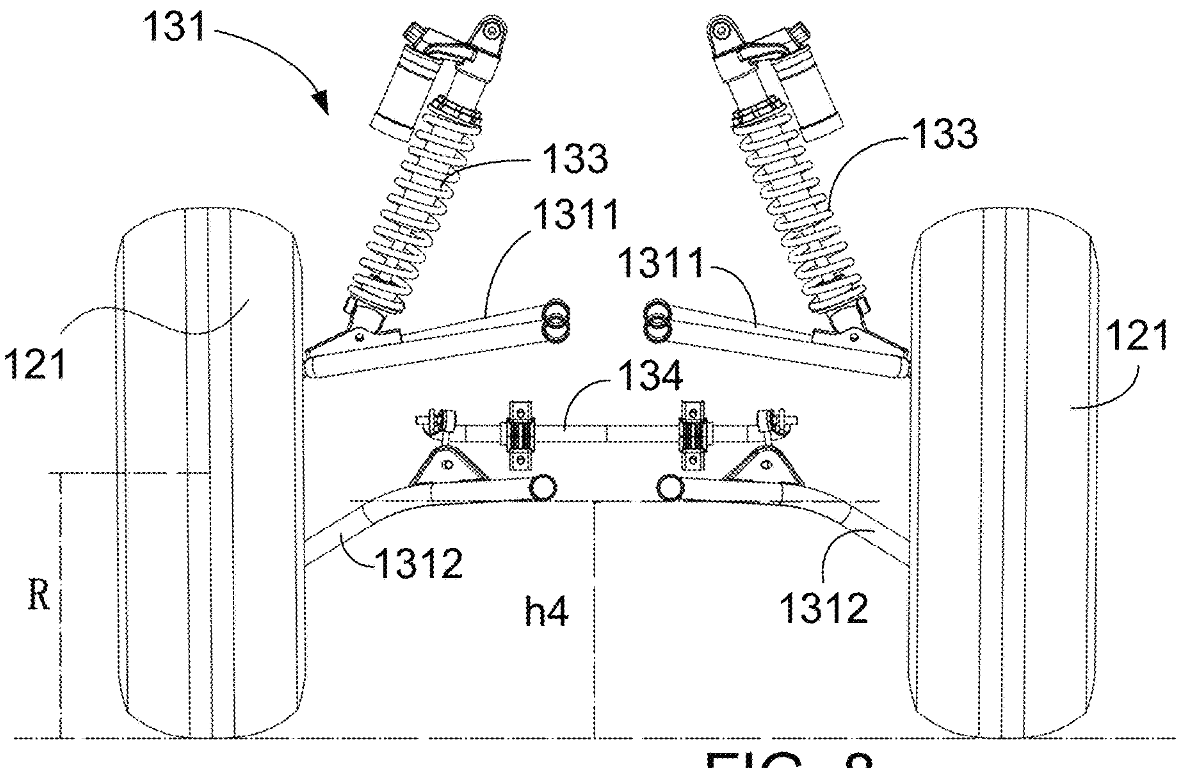
FIG. 8 is front view of the front suspension of FIGS. 2, 4 and 5, also showing the front wheels.

The all-terrain vehicle 100 has a frame clearance distance h4 called out in FIGS. 1 and 8, defined as the distance between the lowest point of the frame 11 and the underlying ground or pavement when the vehicle 100 is resting on a flat surface. A wheel radius R is also called out in FIG. 8. A wheel radius/frame clearance ratio R/h4 for the all terrain vehicle 100 is preferably in the range from 0.9 to 1.4, and more preferably in the range from 1 to 1.3. These preferred ranges of wheel radius/frame clearance ratio R/h4 are higher than most passenger cars intended to be driven on pavement. The frame clearance distance h4 has a large effect on the center of mass height of the all-terrain vehicle 100. Having the wheel radius/frame clearance ratio R/h4 within these preferred ranges improves the maneuvering stability of the all-terrain vehicle 100, while keeping the suspension travel distance acceptable for off-road performance.

Figures 9, 10:
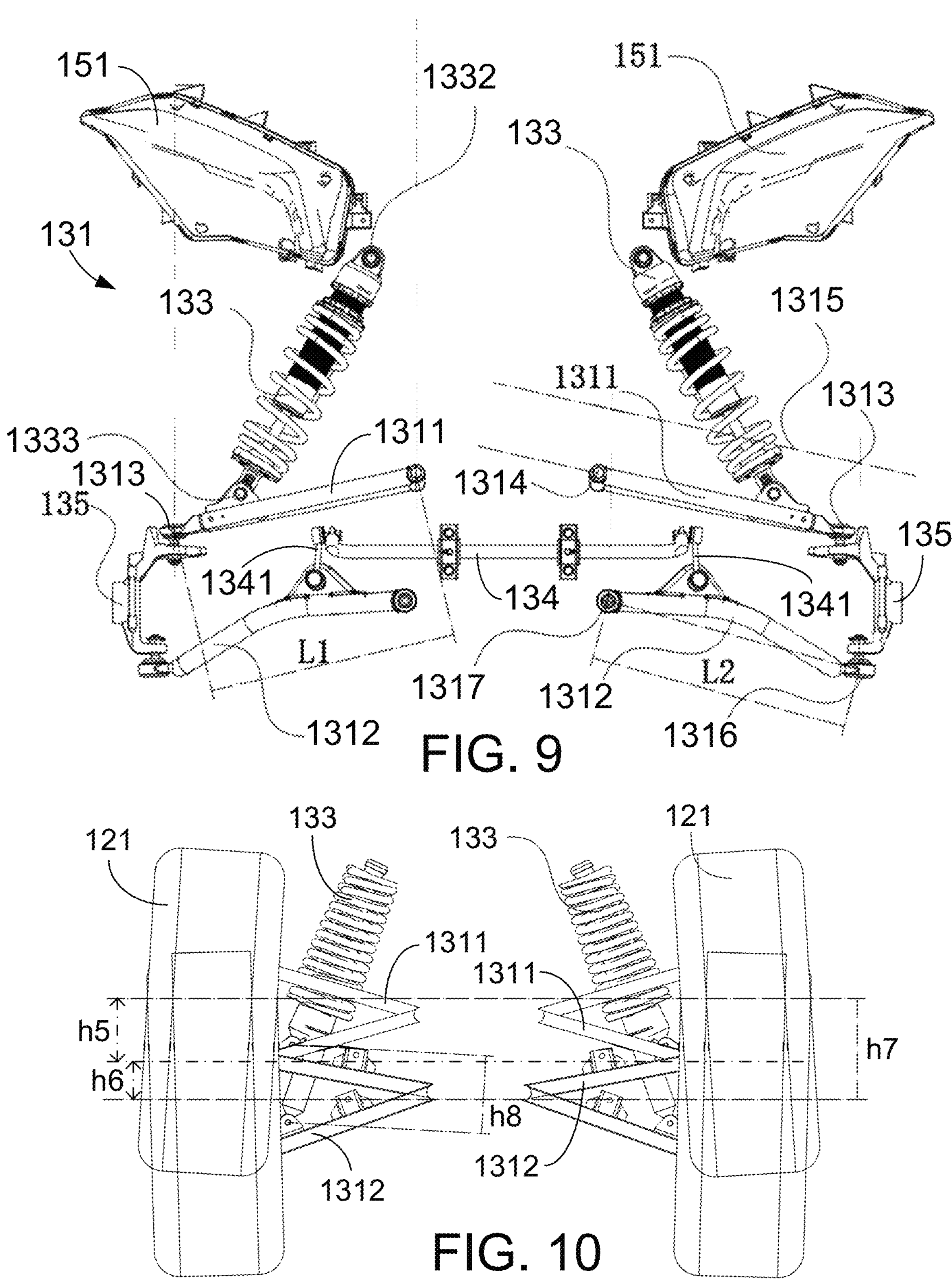
FIG. 9 is a front view of the headlights and front suspension of the all-terrain vehicle of FIG. 1, using a first alternative design for the front shock absorbers, and a first alternative design for the front knuckles.
FIG. 10 is a front schematic view showing suspension travel of the front suspension and front wheels of the all-terrain vehicle FIG. 1 using the front suspension of FIGS. 2, 4 and 5, with a second alternative design for the front shock absorbers.

FIG. 9 shows a front view of the preferred front suspension 131 relative to the front headlights 151 of the vehicle body cover 15. The top pivot mounts 1332 of the front shock absorbers 133 are at an elevation lower than the top of the headlights 151, but higher than and generally above the upper rocker A-arms 1311. More specifically, the top pivot mount 1332 of each front shock absorber 133 is located in the right to left direction inwardly from the outer end 1313 of the respective upper rocker A-arm 1311 and outwardly from the inner end 1314 of the respective upper rocker A-arm 1311. The top pivot mounts 1332 of the front shock absorbers 133 are further at an elevation higher than the bottom of the headlights 151. This location for the top pivot mounts 1332 of the front shock absorbers 133 helps keep the center of gravity for the all-terrain vehicle low, improving the operational stability of the all-terrain vehicle 100.

The bottom pivot mounts 1333 of the front shock absorbers 133 are at an elevation higher than and generally above the lower rocker A-arms 1312, but no higher than 50 mm over the upper rocker A-arms 1311, i.e., below a line 1315 defined as being 50 mm higher than the upper rocker A-arm 1311. The bottom pivot mount 1333 of each front shock absorber 133 is further located in the right to left direction inwardly from the outer end 1316 of the respective lower rocker A-arm 1312 and outwardly from the inner end 1317 of the respective lower rocker A-arm 1312. Similar to the location of the top pivot mounts 1332, this location for the bottom pivot mounts 1333 of the front shock absorbers 133 helps keep the center of gravity for the all-terrain vehicle low, improving the operational stability of the all-terrain vehicle 100. At the same time, these locations for the top and bottom pivot mounts 1332, 1333 allow for an adequate upward and downward stroke of the front shock absorbers 133.

The lengths of the rocker A-arms 1311, 1312 between their pivot axes is also called out on FIG. 9. A rocker A-arm length ratio L1/L2 of the upper rocker A-arm length L1 to the lower rocker A-arm length L2 is preferably in the range from 0.5 to 1.15, more preferably in the range from 0.6 to 1.1, and most preferably in the range from 0.7 to 1. With the rocker A-arm length ratio L1/L2 within these ranges, upward suspension travel decreases camber angle of the front wheel 121, which improves the tire grip of the all-terrain vehicle 100 around corners and improves the handling performance of the all-terrain vehicle 100.

The suspension travel provided by the preferred embodiment is schematically shown in FIG. 10, which depicts the uppermost (bottoming out) and lowermost (airborne) positions of the front wheels 121 due to suspension travel. Maximum upward suspension travel h5 from the suspension rest position is preferably greater than maximum downward suspension travel h6 from the suspension rest position. A suspension ratio h5/h6 of maximum upward suspension travel h5 to maximum downward suspension travel h6 is preferably in the range from 1.1 to 4, more preferably in the range from 1.3 to 3, and most preferably in the range from 1.4 to 2.5. These values for suspension ration h5/h6 ensure that the all-terrain vehicle 100 can maximize its ability to drive over obstacles while improving the comfort of the all-terrain vehicle 100.

Total suspension travel h7 and total shock absorber stroke h8 of the preferred front suspension 131 between bottoming out and airborne positions (h7=h5+h6) is also called out in FIG. 10. A suspension travel/shock absorber stroke ratio h7/h8 of total suspension travel h7 to total shock absorber stroke is preferably in the range from 1.1 to 2, more preferably in the range from 1.2 to 1.9, and most preferably in the range from 1.3 to 1.8. Suspension travel/shock absorber stroke ratios h7/h8 within these ranges allow impacts from obstacles to be more evenly absorbed, providing better cushioning when driving over obstacles.

Figure 11:
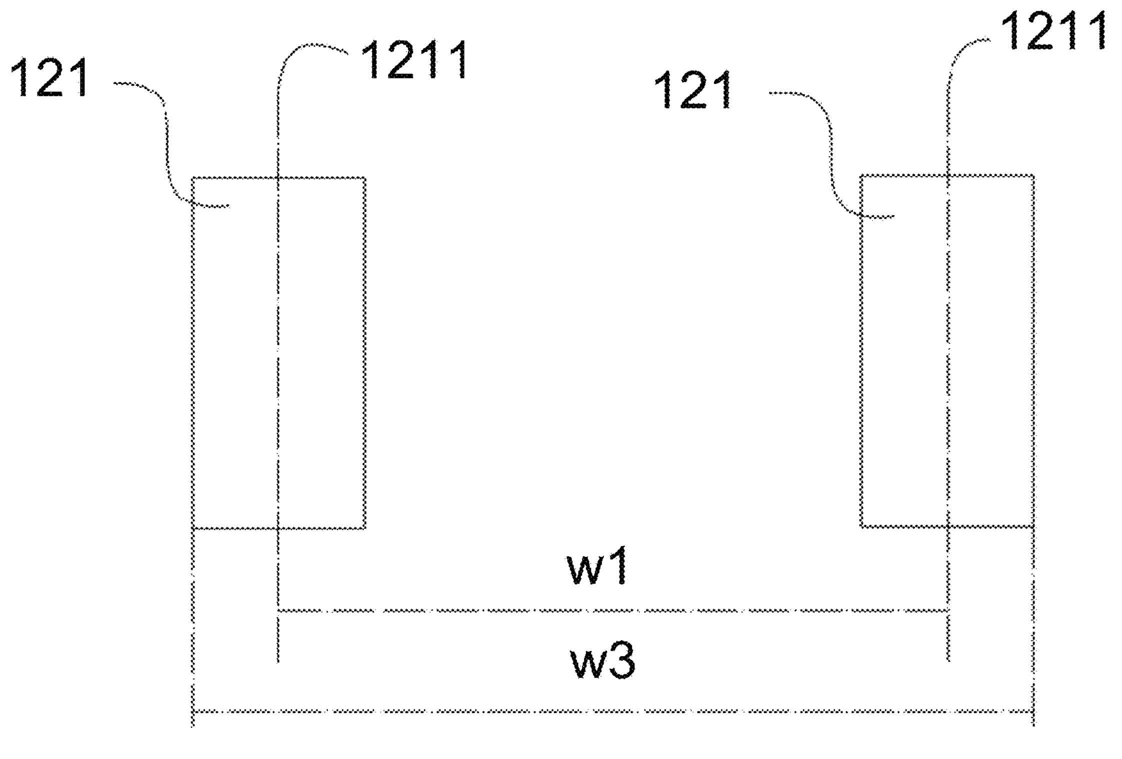
FIG. 11 is a top plan schematic view of the wheels of the all-terrain vehicle of FIG. 1.
Figure 11:
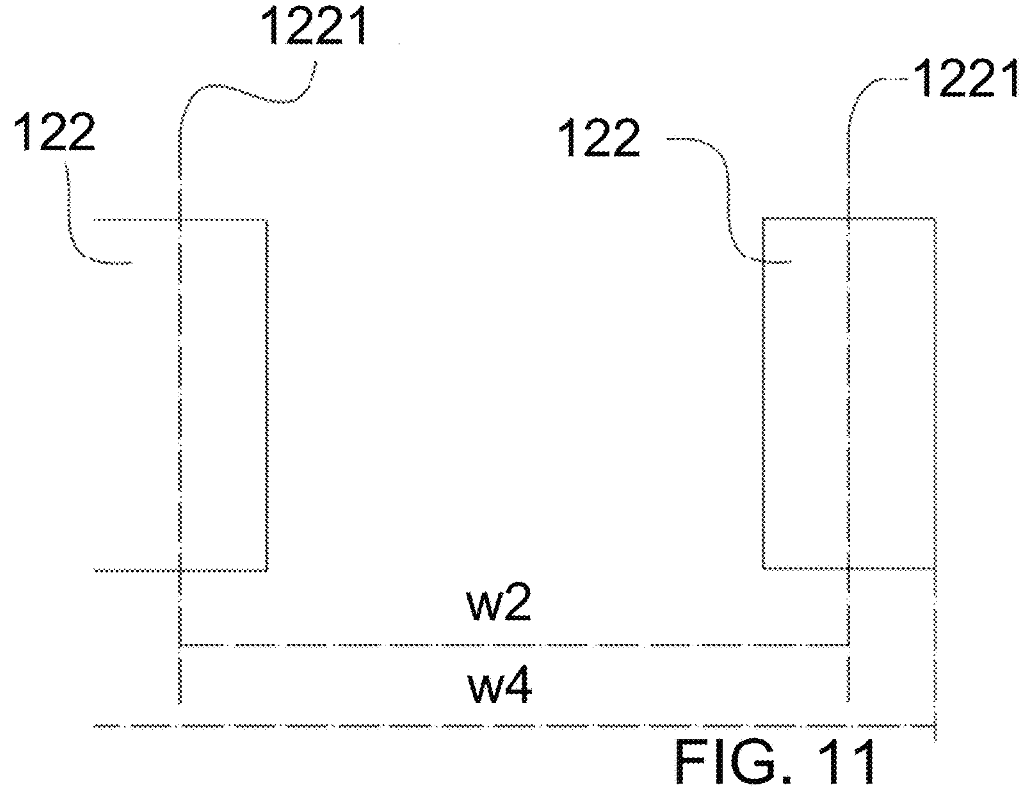

FIG. 11 shows a plan view of the four wheels 12 of the preferred all-terrain vehicle 100. Each wheel 121, 122 defines a wheel mid-plane 1211, 1221 halfway between the right and left edges of the wheel 121, 122. Front-wheel track width w1 between front wheel mid-planes 1211 and rear-wheel track width w2 between rear wheel mid-planes 1221 is called out in FIG. 11. A track width ratio w1/w2 of front-wheel track width w1 to rear-wheel track width w2 is preferably in the range from 0.8 to 1.3, more preferably in the range from 0.9 to 1.2, and most preferably in the range from 1 to 1.1. Track width ratios w1/w2 within these ranges lead to greater stability and more balanced steering of the all-terrain vehicle 100.

Front-wheel total width w3 between outer edges of the two front wheels 121 and rear-wheel total width w4 between outer edges of the two rear wheels 122 is also called out in FIG. 11. A wheel total width ratio w3/w4 of front-wheel total width w3 to rear-wheel total width w4 is preferably in the range from 0.8 to 1.5, more preferably in the range from 0.9 to 1.4, and most preferably in the range from 1 to 1.3. Like track width ratios w1/w2, total width ratios w3/w4 within these ranges lead to greater stability and more balanced steering of the all-terrain vehicle 100.

Figures 12, 13:
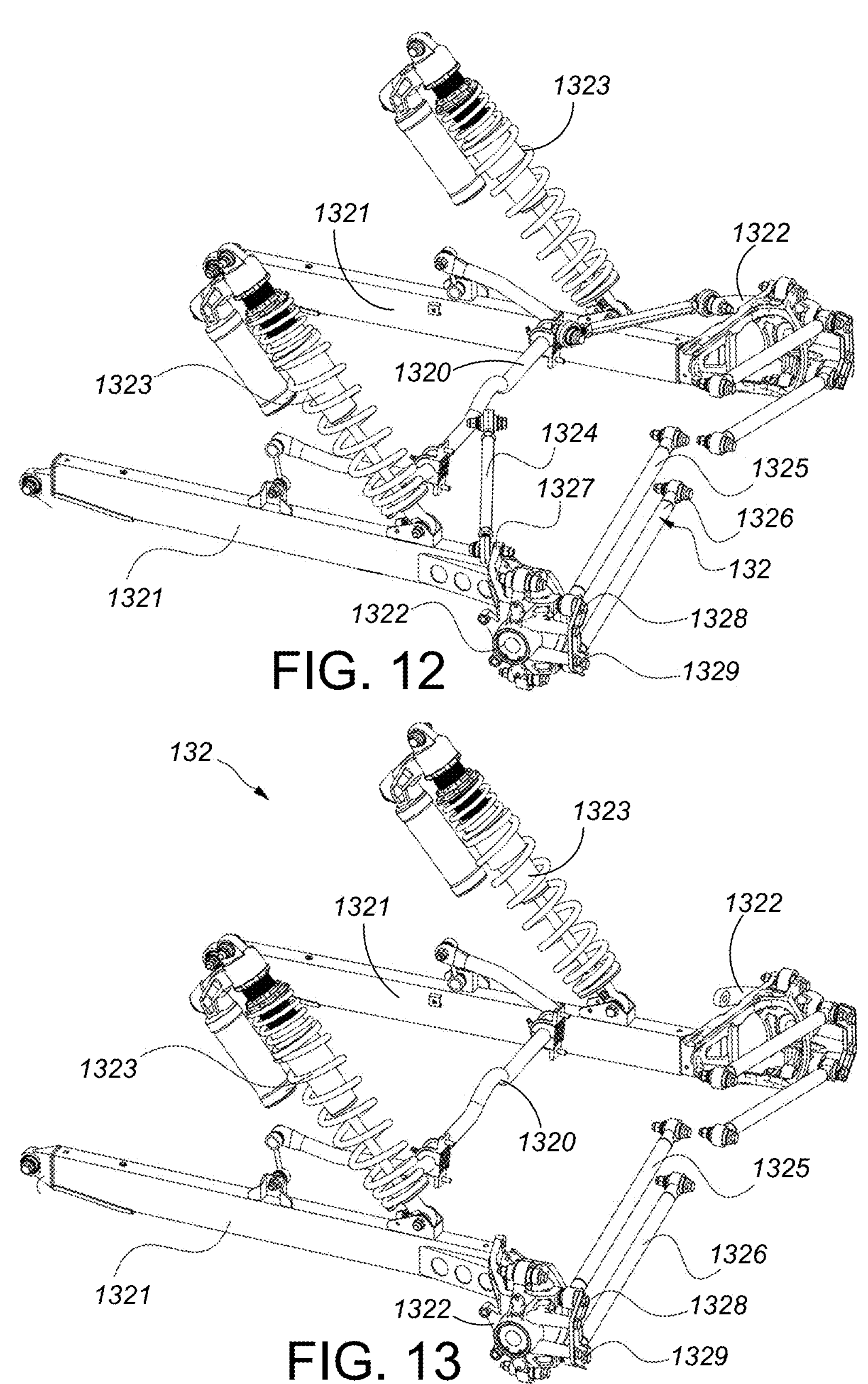
FIG. 12 is a rear left perspective view of the rear suspension of the all-terrain vehicle of FIG. 1.
FIG. 13 is the rear left perspective view of FIG. 12, without showing the front links.

If desired, the design and layout of the front suspension 131 as shown in FIGS. 1-10 can also be used for the rear suspension. More preferably, the rear suspension 132 has a very different design and layout than that of the front suspension 131, with the preferred rear suspension 132 shown in FIGS. 12 and 13 and as further described in U.S. Pat. Nos. 10,723,190 and 11,220,147, both incorporated by reference. In general terms, the rear suspension 132 includes left and right swing arms 1321 pivotally attached to the frame 11 at their front ends and supported by rear knuckles 1322 at their rear ends. Pivoting movement of the left and right swing arms 1321 is dampened by respective rear shock absorbers 1323. Three tie rods 1324, 1325, 1326 further control movement of each rear knuckle 1322, each pivotally attached to the frame 11 their inner ends and pivotally attached by joint bearings 1327, 1328, 1329 to the respective rear knuckle 1322. A rear sway bar 1320 torsionally transfers impact loads from one (left or right) side of the rear suspension 132 to the other side.

The above specific and detailed descriptions of preferred embodiments express only several embodiments of the invention, and such details are not to be construed as limiting the scope of protection of the patent unless expressly included in the appended claims. Professional and technical personnel in the art can make changes and improvements without departing from the concepts of the present invention, all of which fall within the scope of protection subject to the attached claims.

The invention claimed is:

1. An all-terrain vehicle, comprising:

a frame;

wheels comprising a left front wheel, a right front wheel and rear wheels;

a suspension system, comprising a front suspension and a rear suspension; the front wheels connected to the frame by the front suspension and the rear wheels connected to the frame by the rear suspension, wherein the front suspension, for each of the left and right front wheels, comprises a respective upper rocker A-arm pivotally connected to the frame, a respective lower rocker A-arm pivotally connected to the frame, and a respective front knuckle connected between the respective upper and lower rocker A-arms and the respective front wheel;

a prime mover assembly, at least partially disposed on the frame, for providing locomotive power to rotationally drive the wheels; and a drive train at least partially disposed on the frame for transmitting torque from the prime mover assembly to the wheels;

wherein each front knuckle comprises a main body defining a front axle bore, an upper connecting portion for connecting to the respective upper rocker A-arm, and a lower connecting portion for connecting to the respective lower rocker A-arm; and wherein at least one of the upper connecting portion and the lower connecting portion is separately formed from the main body with a flange connected to the main body by a plurality of bolts inserted into bolt holes, the bolt holes defining a flange centerline, such that a camber adjusting spacer can be positioned between the flange and the main body, with the camber adjusting spacer installed entirely on only one side of the flange centerline, to adjust camber of the respective front wheel.

2. The all-terrain vehicle of claim 1, wherein the plurality of bolts connecting the flange to the main body of the front knuckle comprises two bolts, and wherein the camber adjusting spacer comprises two half holes that are positioned partially around the two bolts, such that the camber adjusting spacer can be inserted and removed from its position between the flange and the main body without complete removal of the two bolts from the flange and without complete removal of the two bolts from the main body.

3. The all-terrain vehicle of claim 2, wherein the camber adjusting spacer is positioned above the two bolts.

4. The all-terrain vehicle of claim 3, wherein the camber adjusting spacer is shaped such that when the two half holes are positioned partially around the two bolts, the entirety of the camber adjusting spacer is above the flange center line.

5. The all-terrain vehicle of claim 1, wherein the camber adjusting spacer includes a recess so that the adjusting spacer is substantially C-shaped.

6. The all-terrain vehicle of claim 1, wherein the front suspension, for each of the left and right front wheels, further comprises a respective front shock absorber, each front shock absorber being mounted between a mid-outer portion of the respective upper rocker A-arm and the frame.

7. The all-terrain vehicle of claim 6, wherein the front suspension further comprises a front torsion bar pivotally mounted to the frame and connected by links to middle locations of the lower rocker A-arms, wherein in a transverse direction the links of the front torsion bar are positioned outside top pivot mounts of the front shock absorbers but inside bottom pivot mounts of the front shock absorbers.

8. The all-terrain vehicle of claim 6, wherein each front shock absorber has a rearward shock absorber lean angle $\theta$ in the range from 80° to $<$90° relative to horizontal and an inward shock absorber lean angle relative to horizontal in the range from 50° to 80°.

9. The all-terrain vehicle of claim 6, wherein the all-terrain vehicle further comprises a vehicle cover with headlights, top pivot mounts of the front shock absorbers are at an elevation lower than the top of the headlights and higher than the bottom of the headlights.

10. The all-terrain vehicle of claim 1, wherein, the frame includes a lowest point defining a frame clearance about a horizontal ground plane, wherein the front wheels have a radius, and wherein a wheel radius/frame clearance ratio is in the range from 0.9 to 1.4.

11. An all-terrain vehicle, comprising:

a frame;

wheels comprising a left front wheel, a right front wheel and rear wheels;

a suspension system, comprising a front suspension and a rear suspension; the front wheels connected to the frame by the front suspension and the rear wheels connected to the frame by the rear suspension, wherein the front suspension, for each of the left and right front wheels, comprises a respective upper rocker A-arm pivotally connected to the frame, a respective lower rocker A-arm pivotally connected to the frame, and a respective front knuckle connected between the respective upper and lower rocker A-arms and the respective wheel, each upper rocker A-arm having an upper rocker A-arm length, each lower rocker A-arm having a lower rocker A-arm length, wherein a rocker A-arm length ratio of the upper rocker A-arm length to the lower rocker A-arm length is in the range from 0.5 to 1.15;

a prime mover assembly, at least partially disposed on the frame, for providing locomotive power to rotationally drive the wheels; and a drive train at least partially disposed on the frame for transmitting torque from the prime mover assembly to the wheels, the drive train comprising a front differential and left and right front half shafts, wherein the half shafts slope downwardly and outwardly, defining a half shaft front view projection angle in front view and relative to horizontal in the range from 0° to 60°;

wherein each front knuckle comprises a main body defining a front axle bore, an upper connecting portion for connecting to the respective upper rocker A-arm, and a lower connecting portion for connecting to the respective lower rocker A-arm; and wherein at least one of the upper connecting portion and the lower connecting portion is separately formed from the main body with a flange connected to the main body by a plurality of bolts inserted into bolt holes, the bolt holes defining a flange centerline, such that a camber adjusting spacer can be positioned between the flange and the main body, with the camber adjusting spacer installed entirely on only one side of the flange centerline, to adjust camber of the respective front wheel.

12. The all-terrain vehicle of claim 11, wherein the plurality of bolts connecting the flange to the main body of the front knuckle comprises two bolts, and wherein the camber adjusting spacer comprises two half holes that are positioned partially around the two bolts, such that the camber adjusting spacer can be inserted and removed from its position between the flange and the main body without complete removal of the two bolts from the flange and without complete removal of the two bolts from the main body.

13. The all-terrain vehicle of claim 12, wherein the camber adjusting spacer is shaped such that when the two half holes are positioned partially around the two bolts, the entirety of the camber adjusting spacer is above the flange center line.

14. The all-terrain vehicle of claim 13, wherein the camber adjusting spacer includes a recess so that the adjusting spacer is substantially C-shaped.

15. The all-terrain vehicle of claim 11, wherein the front suspension, for each of the left and right front wheels, further comprises a respective front shock absorber, each front shock absorber being mounted between a mid-outer portion of the respective upper rocker A-arm and the frame, wherein the front suspension further comprises a front torsion bar pivotally mounted to the frame and connected by links to middle locations of the lower rocker A-arms, wherein in a transverse direction the links of the front torsion bar are positioned outside top pivot mounts of the front shock absorbers but inside bottom pivot mounts of the front shock absorbers.

16. The all-terrain vehicle of claim 15, wherein each front shock absorber has a rearward shock absorber lean angle θ in the range from 80° to <90° relative to horizontal and an inward shock absorber lean angle relative to horizontal in the range from 50° to 80°.

17. The all-terrain vehicle of claim 15, wherein the all-terrain vehicle further comprises a vehicle cover with headlights, top pivot mounts of the front shock absorbers are at an elevation lower than the top of the headlights and higher than the bottom of the headlights.

18. A method of adjusting camber of at least one front wheel of an all-terrain vehicle, the all-terrain vehicle comprising:

a frame;

wheels comprising a left front wheel, a right front wheel and rear wheels;

a suspension system, comprising a front suspension and a rear suspension; the front wheels connected to the frame by the front suspension and the rear wheels connected to the frame by the rear suspension, wherein the front suspension, for each of the left and right front wheels, comprises a respective upper rocker A-arm pivotally connected to the frame, a respective lower rocker A-arm pivotally connected to the frame, and a respective front knuckle connected between the respective upper and lower rocker A-arms and the respective front wheel;

a prime mover assembly, at least partially disposed on the frame, for providing locomotive power to rotationally drive the wheels; and a drive train at least partially disposed on the frame for transmitting torque from the prime mover assembly to the wheels;

wherein each front knuckle comprises a main body defining a front axle bore, an upper connecting portion for connecting to the respective upper rocker A-arm, and a lower connecting portion for connecting to the respective lower rocker A-arm; and wherein at least one of the upper connecting portion and the lower connecting portion is separately formed from the main body with a flange connected to the main body by at least one fastener, with a first camber adjusting spacer positioned between the flange and the main body to set camber of the respective front wheel;

wherein the method comprises:

loosening the at least one fastener without removing the at least one fastener from the flange and without removing the at least one fastener from the main body, such that the flange can be moved slightly relative to the main body of the front knuckle;

removing the first camber adjusting spacer from the front knuckle;

inserting a second camber adjusting spacer into a position previously occupied by the first camber adjusting spacer, between the flange and the main body of the front knuckle, the second camber adjusting spacer being a different thickness than the first camber adjusting spacer; and tightening the at least one fastener to set camber of the respective front wheel at an adjusted camber.

19. The method of claim 18, wherein the at least one fastener connecting the flange to the main body of the front knuckle comprises two bolts, and wherein the camber adjusting spacer comprises two half holes, and wherein the act of inserting the second camber adjusting spacer comprises placing the second camber adjusting spacer such that the two half holes are positioned partially around the two bolts and the two bolts gravitationally support the second camber adjusting spacer before tightening of the two bolts.

* * * * *